US008731317B2

(12) United States Patent
Sanchez et al.

(10) Patent No.: US 8,731,317 B2
(45) Date of Patent: May 20, 2014

(54) IMAGE CLASSIFICATION EMPLOYING IMAGE VECTORS COMPRESSED USING VECTOR QUANTIZATION

(75) Inventors: Jorge Sanchez, Cordoba (AR); Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 834 days.

(21) Appl. No.: 12/890,789

(22) Filed: Sep. 27, 2010

(65) Prior Publication Data

US 2012/0076401 A1 Mar. 29, 2012

(51) Int. Cl.
*G06K 9/00* (2006.01)
(52) U.S. Cl.
USPC .......................................... 382/253; 382/224
(58) Field of Classification Search
None
See application file for complete search history.

(56) References Cited

U.S. PATENT DOCUMENTS

| 6,404,923 | B1 * | 6/2002 | Chaddha ...................... 382/224 |
|---|---|---|---|
| 7,680,341 | B2 | 3/2010 | Perronnin |
| 7,756,341 | B2 | 7/2010 | Perronnin |
| 8,077,994 | B2 * | 12/2011 | Zhang et al. .................. 382/253 |
| 2008/0069456 | A1 | 3/2008 | Perronnin |
| 2009/0144033 | A1 | 6/2009 | Liu et al. |
| 2010/0040285 | A1 | 2/2010 | Csurka et al. |
| 2010/0092084 | A1 | 4/2010 | Perronnin et al. |
| 2010/0098343 | A1 | 4/2010 | Perronnin et al. |
| 2010/0189354 | A1 | 7/2010 | De Campos et al. |
| 2010/0191743 | A1 | 7/2010 | Perronnin et al. |
| 2011/0135007 | A1 * | 6/2011 | Vasilache et al. ........ 375/240.22 |
| 2011/0262033 | A1 * | 10/2011 | Huo et al. ..................... 382/161 |

OTHER PUBLICATIONS

Zhao, David Y., Jonas Samuelsson, and Mattias Nilsson. "GMM-based entropy-constrained vector quantization." Acoustics, Speech and Signal Processing, 2007. ICASSP 2007. IEEE International Conference on. vol. 4. IEEE, 2007.*
Zhao, David, Jonas Samuelsson, and Mattias Nilsson. "On entropy-constrained vector quantization using Gaussian mixture models." Communications, IEEE Transactions on 56.12 (2008): 2094-2104.*
Lin, Yih-Chuan, and Shen-Chuan Tai. "A fast Linde-Buzo-Gray algorithm in image vector quantization." Circuits and Systems II: Analog and Digital Signal Processing, IEEE Transactions on 45.3 (1998): 432-435.*
Oehler, Karen L., and Robert M. Gray. "Combining image compression and classification using vector quantization." Pattern Analysis and Machine Intelligence, IEEE Transactions on 17.5 (1995): 461-473.*
Perronnin et al., "Fisher Kernels on Visual Vocabularies for Image Categorization," CVPR (2007).

(Continued)

*Primary Examiner* — Stephen R Koziol
*Assistant Examiner* — Sean Conner
(74) *Attorney, Agent, or Firm* — Fay Sharpe LLP

(57) ABSTRACT

Local descriptors are extracted from an image. An image vector is generated having vector elements indicative of parameters of mixture model components of a mixture model representing the extracted local descriptors. The image vector is compressed using a vector quantization algorithm to generate a compressed image vector. Optionally, the compressing comprises splitting the image vector into a plurality of sub-vectors each including at least two vector elements, compressing each sub-vector independently using the vector quantization algorithm, and concatenating the compressed sub-vectors to generate the compressed image vector. Optionally, each sub-vector includes only vector elements indicative of parameters of a single mixture model component, and any sparse sub-vector whose vector elements are indicative of parameters of a mixture model component that does not represent any of the extracted local descriptors is not compressed.

19 Claims, 7 Drawing Sheets

(56) References Cited

OTHER PUBLICATIONS

Perronnin et al., "Large-Scale Image Retrieval with compressed Fisher Vectors," IEEE (2010).
Arthur et al., "k-means++: the Advantages of Careful Seeding," ACM-SIAM Symp. On Discrete Algorithms (2007).
Cho et al., "Minimum sum-sqared residue co-clustering of gene expression data," ICDM (2004).
Jegou et al., "Product quantization for nearest neighbor search," IEEE Trans. on Pami (2010).
Shi etal., "Hash Kernels," AISTATS (2009).
Weinberger et al., "Feature Hashing for Large Scale Multitask Learning," ICML (2009).
Indyk et al., "Approximate Nearest Neighbors: Towards Removing the Curse of Dimensionality," Symp. on Theory of Computing (1998).
Gray et al., "Quantization," IEEE Trans. on Information Theory, 44(6), pp. 2325-2383 (1998).

* cited by examiner

IMAGE CLASSIFICATION EMPLOYING IMAGE VECTORS COMPRESSED USING VECTOR QUANTIZATION

BACKGROUND

The following relates to the image classification arts, object classification arts, and so forth.

In image classification, the image is typically converted to a quantitative representation that embodies image characteristics of interest and which is then compared with corresponding quantitative representations of other images, and/or processed using a classifier trained to process the quantitative representation. Image classifiers have applications such as indexing of images, retrieval of images, or so forth.

The quantitative image representation is sometimes derived from so-called "patches". In this approach, the image is divided into regions, or patches, a representative vector is constructed for each patch, and these results are concatenated or otherwise combined to generate the quantitative representation. The use of patches distributed across the image ensures that the quantitative representation is representative of the image as a whole while also including components representing smaller portions of the image. In some approaches, the patches may be of varying sizes and may overlap in order to provide components representing different objects (e.g., faces, animals, sky, or so forth) having different size scales and located at different, and possibly overlapping, places in the image.

One approach that has been used is the "bag-of-visual-words" (BOV) concept derived from text document classification schemes. This analogizes to the classifying of text documents, in which a "bag of words" is suitably a vector or other representation whose components indicate occurrence frequencies (or counts) of words in the text document. The bag of words is then a suitable text document representation for classification tasks. To extend this approach to image classification, a "visual" vocabulary is created. In some approaches, a visual vocabulary is obtained by clustering low-level features extracted from patches of training images, using for instance K-means. In other approaches, a probabilistic framework is employed, and it is assumed that there exists an underlying generative model such as a Gaussian Mixture Model (GMM), and the visual vocabulary is estimated for instance using Expectation-Maximization (EM). In such "bag of visual words" representations, each "word" corresponds to a grouping of typical low-level features. Depending on the training images from which the vocabulary is derived, the visual words may, for instance, correspond to image features such as objects, or characteristic types of background, or so forth.

The Fisher kernel (FK) is a generic framework which combines the benefits of generative and discriminative approaches for image classification. In the context of image classification the FK has been used to extend the bag-of-visual-words (BOV) representation by going beyond count statistics. See, e.g. Perronnin et al., "Fisher kernels on visual vocabularies for image categorization" in CVPR (2007) which is incorporated herein by reference in its entirety.

For further reference, the following U.S. patents and published U.S. patent applications are referenced, and each of the following patents/publications is incorporated herein by reference in its entirety: Perronnin, U.S. Pub. No. 2008/0069456 A1 published Mar. 20, 2008 and titled "Bags of visual context-dependent words for generic visual categorization"; Liu et al., U.S. Pub. No. 2009/0144033 A1 published Jun. 4, 2009 and titled "Object comparison, retrieval, and categorization methods and apparatuses"; Csurka et al., U.S. Pub. No. 2010/0040285 A1 published Feb. 18, 2010 and titled "System and method for object class localization and semantic class based image segmentation"; Perronnin et al., U.S. Pub. No. 2010/0092084 A1 published Apr. 15, 2010 and titled "Representing documents with runlength histograms"; Perronnin et al., U.S. Pub. No. 2010/0098343 A1 published Apr. 22, 2010 and titled "Modeling images as mixtures of image models"; Perronnin et al., U.S. Pub. No. 2010/0191743 A1 published Jul. 29, 2010 and titled "Contextual similarity measures for objects and retrieval, classification, and clustering using same"; de Campos et al., U.S. Pub. No. 2010/0189354 A1 titled "Modeling images as sets of weighted features"; Perronnin, U.S. Pat. No. 7,756,341 issued Jul. 13, 2010 and titled "Generic visual categorization method and system"; and Perronnin, U.S. Pat. No. 7,680,341 issued Mar. 16, 2010 and titled "Generic visual classification with gradient components-based dimensionality enhancement."

The following sets forth improved methods and apparatuses.

BRIEF DESCRIPTION

In some illustrative embodiments disclosed as illustrative examples herein, a storage medium stores instructions executable by a processor to perform a method comprising: extracting local descriptors from an image; generating an image vector having vector elements indicative of parameters of mixture model components of a mixture model representing the extracted local descriptors; and compressing the image vector using a vector quantization algorithm to generate a compressed image vector. In some such illustrative embodiments, the compressing comprises splitting the image vector into a plurality of sub-vectors wherein each sub-vector includes at least two vector elements, compressing each sub-vector independently using the vector quantization algorithm, and concatenating the compressed sub-vectors to generate the compressed image vector. In some such illustrative embodiments each sub-vector includes only vector elements indicative of parameters of a single mixture model component, and the compressing of each sub-vector does not compress any sparse sub-vector whose vector elements are indicative of parameters of a mixture model component that does not represent any of the extracted local descriptors.

In some illustrative embodiments disclosed as illustrative examples herein, the method performed by a storage medium as set forth in the immediately preceding paragraph further comprises: performing the extracting, generating, and compressing operations on a corpus of training images to generate compressed training vectors; and iteratively learning a classifier by iteratively repeating the operations of (i) uncompressing one or more of the compressed training vectors and (ii) performing an update learning operation using the one or more uncompressed training vectors to update the classifier. In some such illustrative embodiments, the method further includes classifying an input image by performing the extracting and generating operations on the input image to generate an input image vector and applying the learned classifier to the input image vector.

In some illustrative embodiments disclosed as illustrative examples herein, a method comprises: extracting local descriptors from an image; generating an image vector having vector elements indicative of parameters of mixture model components of a mixture model representing the extracted local descriptors; splitting the image vector into a plurality of sub-vectors wherein each sub vector includes at least two vector elements; compressing each sub-vector independently using a vector quantization algorithm; and concatenating the compressed sub vectors to generate a compressed image vector representing the image; wherein the extracting, generating, splitting, compressing, and concatenating are performed by a digital processor.

In some illustrative embodiments disclosed as illustrative examples herein, a method is disclosed as set forth in the immediately preceding paragraph, in which each sub-vector includes only vector elements indicative of parameters of a single mixture model component, and the compressing and concatenating operations do not compress and concatenate any sub-vector whose vector elements are indicative of parameters of a mixture model component that does not represent any of the extracted local descriptors.

In some illustrative embodiments disclosed as illustrative examples herein, an apparatus comprises a digital processor configured to perform: (1) a method of generating a corpus of compressed training image vectors from a corpus of training images, in which the method includes extracting local descriptors from a training image, generating an image vector having vector elements indicative of parameters of mixture model components of a mixture model representing the extracted local descriptors, compressing the image vector, and repeating the extracting, generating, and compressing for a plurality of training images of the corpus of training images; and (2) a learning method that iteratively learns a classifier by iteratively repeating operations including: uncompressing one or more of the compressed training image vectors, and performing an update learning operation using the one or more uncompressed training vectors to update the classifier.

DETAILED DESCRIPTION

Figure 1:
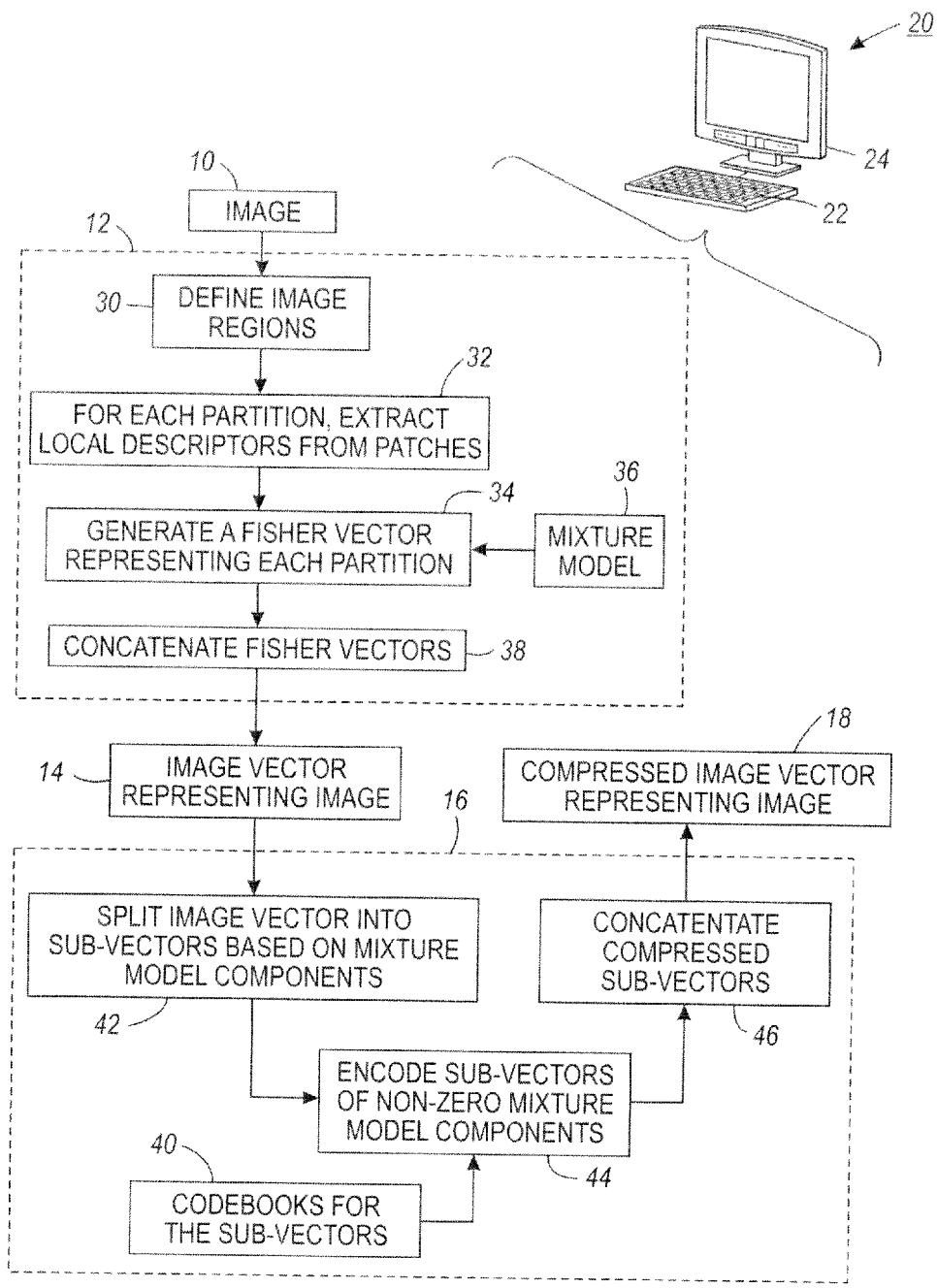
FIG. 1 diagrammatically shows a system for generating a compressed Fisher vector representing an image.

With reference to FIG. 1, an image 10 is processed by an image vector computation module 12 to generate an image vector 14 that is representative of content of the image 10. The image vector 14 is a more compact representation of the image 10 and can, for example, be used to represent the image 10 in a classification operation, in an images clustering operation, or so forth. As disclosed herein, however, the image vector 14, although more compact than the image 10, is still relatively large, for example of order one-half megabyte in size in some embodiments. Accordingly, an image compression module 16 is applied to compress the image vector 14 using a vector quantization algorithm to generate a compressed image vector 18.

The illustrative processing components 12, 16 are suitably embodied by a digital processor or digital processing device, such as an illustrative computer 20 including a keyboard 22 or other input device and a display device 24. Alternatively, the processing components 12, 16 may be embodied by another digital processor or digital processing device such as a digital camera, a digital video recorder, a personal data assistant (FDA) or "smartphone" (optionally including a built-in camera), a network server, an electronic tablet, or so forth.

The image 10 comprises a digital image that may be variously generated, for example by a digital camera, or by a film-based camera whose photograph is scanned by an optical scanner to generate a digital image, or by a drawing application program, graphical art program, or other application program that outputs a bitmapped or pixmapped image, or so forth. The image 10 may be generated at the computer 20, or may be received from elsewhere by the computer 20 via a digital network such as the Internet or via a portable digital storage medium such as an optical disk. The image 10 may be grayscale, binary, color, or so forth. Although not illustrated, it is to be understood that the image processing components may include one or more format converters (not shown) that provide the image 10 in a standard format. Still further, while in the illustrative examples the image 10 is two-dimensional, more generally the image 10 may be of higher dimensionality, for example a three-dimensional image generated by a computed tomography (CT) scanner.

Additionally, it will be appreciated that the illustrative processing components 12, 16 are suitably embodied as a storage medium storing instructions executable by a digital processor or digital processing device to perform the functionality of the processing components 12, 16. The storage medium may, for example, be a hard disk drive or other magnetic storage medium, and/or an optical disc or other optical storage medium, and/or a random access memory (RAM), read-only memory (ROM), flash memory, or other electronic storage medium; various combinations thereof, or so forth.

The image vector computation module 12 generates the image vector 14 based on local descriptors that are extracted from an image 10. In a suitable approach, various patches are defined in the image 10 and local descriptors are extracted from each patch. Optionally, the image is first broken up into regions in order to more effectively capture spatial distribution of the image content in the image 10. Toward this end, in the illustrative embodiment of FIG. 1 a region defining operation 30 is optionally performed to partition the image 10 into a plurality of image regions, followed by an operation 32 of extracting local descriptors from patches defined in each image region. In one illustrative example, the region defining operation 30 divides the image into four regions: a first image region corresponding to the entire input image 10; and three additional image regions corresponding to top, middle, and bottom portions of the image 10.

The operation 32 extracts local descriptors for each image region. In some embodiments, the local descriptors comprise SIFT descriptors. See, e.g. Lowe, "Distinctive image features from scale-invariant keypoints", IJCV vol. 60 (2004). In one illustrative example employing SIFT features, the features are extracted from 32×32 pixel patches on regular grids (every 16 pixels) at five scales, using 128-D SIFT descriptors. Other suitable features include simple 96-D color features in which a patch is subdivided into 4×4 sub-regions and in each sub-region the mean and standard deviation are computed for the three R, G and B channels. The number of features is optionally reduced, e.g. to 64 dimensions, using Principal Component Analysis (PCA). These are merely illustrative examples, and additional and/or other local descriptors can be used.

With continuing reference to FIG. 1, an operation 34 generates an image vector for each image (or image region) based on the extracted local descriptors of that image (or image region). In the illustrative example, the operation 34 computes a Fisher vector for each image region by modeling the extracted local descriptors of the image region using a mixture model 36 to generate a corresponding image region vector having vector elements that are indicative of parameters of mixture model components of the mixture model 36 representing the extracted local descriptors of the image region. In some illustrative embodiments set forth herein, the mixture model 36 is a Gaussian mixture model having Gaussian mixture components. In an operation 38, the Fisher vectors of the image regions are concatenated to form the final image vector 14 representing the image 10.

An illustrative example of computing a Fisher vector representation for an image (or image region) is described. Let $X = \{x_t, t=1, \ldots, T\}$ be the set of local descriptors extracted from T patches of an image (or image region). It is assumed here that the generation process of X can be modeled by a (probabilistic) mixture model $u_\lambda$ with parameters $\lambda$. The features X can then be described by a gradient vector (see, e.g. Jaakkola et al., "Exploiting generative models in discriminative classifiers", in NIPS (1999)):

$$G_\lambda^X = \nabla_\lambda f_\lambda(X) = \frac{1}{T} \nabla_\lambda (\log u_\lambda(X)) \tag{1}$$

where X denotes the local descriptors extracted from the image (or image region) and $f_\lambda(X)$ denotes a probability function parameterized by parameters $\lambda$. In the rightmost expression of Equation (1), the illustrative probability function $f_\lambda(X) = T^{-1} \log u_\lambda(X)$ is a log-likelihood composition of the mixture model $u_\lambda$. The gradient of the log-likelihood describes the contribution of the parameters to the generation process. The dimensionality of this vector depends only on the number of parameters in $\lambda$, but not on the number of patches T. A natural kernel on these gradients is:

$$K(X,Y) = G_\lambda^X{}' F_\lambda^{-1} G_\lambda^Y \tag{2}$$

where $F_\lambda$ is the Fisher information matrix of $u_\lambda$, and is given by:

$$F_\lambda = E_{x \sim u_\lambda}[\nabla_\lambda \log u_\lambda(x) \nabla_\lambda \log u_\lambda(x)'] \tag{3}$$

As $F_\lambda$ is symmetric and positive definite, $F_\lambda^{-1}$ has a Cholesky decomposition $F_\lambda^{-1} = L_\lambda' L_\lambda$ and $K(X,Y)$ can be rewritten as a dot-product between normalized vectors $G_\lambda$ with:

$$\mathcal{G}_\lambda^X = L_\lambda G_\lambda^X \tag{4}$$

The vector $\mathcal{G}_\lambda^X$ is referred to herein as the Fisher vector of the set of local descriptors X extracted from the image (or image region). Learning a kernel classifier using the kernel of Equation (2) is equivalent to learning a linear classifier on the Fisher vectors $\mathcal{G}_\lambda^X$. Learning linear classifiers can be done efficiently.

In illustrative examples set forth herein, the mixture model $u_\lambda$ is selected to be a Gaussian mixture model (GMM). See, e.g. Perronnin et al., "Fisher kernels on visual vocabularies for image categorization" in CVPR (2007). Here $u_\lambda = \sum_{i=1}^{N} \omega_i u_i(x)$ and the parameters are $\lambda = \{\omega_i, \mu_i, \Sigma_i, i=1, \ldots, N\}$, where $\omega_i$, $\mu_i$, and $\Sigma_i$ are respectively the mixture weight, mean vector, and covariance matrix of the Gaussian $u_i$. It is assumed in the illustrative examples employing a GMM that the covariance matrices $\Sigma_i$ are diagonal and the thus corresponding variance vector is denoted as $\sigma_i^2$. The GMM $u_\lambda = \sum_{i=1}^{N} \omega_i u_i(x)$ is suitably trained on a training set of images using a suitable training algorithm such as maximum likelihood (ML) estimation. The trained GMM is intended to describe the content of any image within a range of interest (for example, any color photograph if the range of interest is color photographs; or, any image of a black and white document if the range of interest is black and white documents, or so forth). It is further assumed in these illustrative examples that the descriptor sets $x_t$ for the various image patches $t=1, \ldots, T$ are generated independently by the GMM $u_\lambda$, and therefore:

$$G_\lambda^X = \frac{1}{T} \sum_{t=1}^{T} \nabla_\lambda (\log u_\lambda(x_t)). \tag{5}$$

The gradient is considered here with respect to the mean and standard deviation parameters (typically, the gradient with respect to the weight parameters provides little additional information). Use is made of the diagonal closed-form approximation (see e.g. Perronnin et al., "Fisher kernels on visual vocabularies for image categorization" in CVPR (2007)), in which case the normalization of the gradient by $L_\lambda = F_\lambda^{-1/2}$ is effectively a whitening of the dimensions. Let $\gamma_t(i)$ be the soft assignment of descriptor $x_t$ to the Gaussian i according to:

$$\gamma_t(i) = \frac{\omega_i u_i(x_t)}{\sum_{j=1}^{N} \omega_j u_j(x_t)}. \tag{6}$$

Let D denote the dimensionality of the descriptors $x_t$. Let $\mathcal{G}_{\mu,i}^X$ (resp. $\mathcal{G}_{\sigma,i}^X$) be the D-dimensional gradient with respect to the mean $\mu_i$ (resp. standard deviation $\sigma_i$) of the Gaussian component i. It can be shown that the following holds:

$$\mathcal{G}_{\mu,i}^X = \frac{1}{T\sqrt{\omega_i}} \sum_{t=1}^{T} \gamma_t(i) \left( \frac{x_t - \mu_i}{\sigma_i} \right) \tag{7}$$

and $$\mathcal{G}_{\sigma,i}^X = \frac{1}{T\sqrt{2\omega_i}} \sum_{t=1}^{T} \gamma_t(i) \left[ \frac{(x_t - \mu_i)^2}{\sigma_i^2} - 1 \right], \tag{8}$$

where the division between vectors is as a term-by-term operation. The final gradient vector $\mathcal{G}_\lambda^X$ is the concatenation of the and $\mathcal{G}_{\mu,i}^X$ and $\mathcal{G}_{\sigma,i}^X$ vectors for $i=1, \ldots, N$ and is therefore 2ND-dimensional.

In embodiments employing image partitioning, for example via the region defining operation 30, the operation 34 generates a Fisher vector for each image region in accordance with Equation (5). The operation 38 then concatenates these Fisher vectors to generate the image vector 14. In this case the final image vector 14 is 2NDR-dimensional, where R denotes the number of regions (e.g., R=4 in the illustrative example of four regions consisting of the total image and top, middle, and bottom regions). Advantageously, partitioning the image into regions retains spatial location information in the image, since (by way of illustrative example) if a dog is shown in a lower portion of the image then the Fisher vector for the lower image portion will particularly reflect descriptors of dog images.

On the other hand, the image partitioning or region definition is optional. If image partitioning is not employed, then the region defining operation 30 and the concatenation operation 38 are both omitted, and the operations 32, 34 operate on the entire image 10 with the operation 34 directly generating the image vector 14 representing the image 10.

The image vector 14 representing the image 10 is substantially more compact than the image 10 itself, where compactness or size is measured by the amount of memory or storage occupied by the image vector 14 or image 10. However, the image vector 14 can still be relatively large. By way of example, in some suitable embodiments: the GMM includes N=256 Gaussian components; the descriptors $x_t$ have dimensionality D=64; and partitioning is employed with the number of image regions being R=4. If the Fisher vector of Equation (5) includes gradients computed for each Gaussian mean $\mu_i$ and for each Gaussian variance $\sigma_i$, but not for each Gaussian weight $\omega_i$, then the number of gradients P computed per Gaussian component is P=2D=128 gradients. In this case the Fisher vector has dimensionality E=N×P×R=256×128×4=131,072 dimensions. If four-byte floating point arithmetic is used to represent the dimensions, then the Fisher vector 14 for the single image 10 occupies 512 kilobytes which is one-half megabyte.

Processing of large image vectors can be costly, especially if the processing operates on a large number of images. An illustrative application is the training of an image classifier, in which a set of hundreds, thousands, tens of thousands, or more images may be utilized in the training. By way of example, if 5,000 training images are employed, with the image vector for each training image being 0.5 megabytes in size, then the set of training image vectors has a size of about 2.5 gigabytes. This introduces substantial costs, measurable for example as a local memory cost (for example, how much RAM and/or swap memory is used), or as a long-term storage cost (for example, the hard disk space used to store the training image representations), or as a data transfer cost (quantifiable, for example, in terms of bandwidth required to transfer the training image representations from long-term storage into local memory for the training, or quantifiable in terms of transfer time for this transfer), or so forth.

It is recognized herein that these substantial costs can be reduced by compressing the image vectors. If a dimensionality reduction approach such as Principal Components Analysis (PCA) is employed, then the retained dimensions should be chosen so as to retain the most useful information. However, approaches for the selection are computationally intensive and sometimes of limited effectiveness on high-dimensional vectors.

To overcome these difficulties, in embodiments disclosed herein the compression of the image vectors employs a vector quantization algorithm. In brief, this approach defines a set of standard vectors in the vector space, and a given image vector is compressed by (1) identifying the closest standard vector and (2) representing the image vector by a short "codeword" representing that closest standard vector. A "codebook" provides the associations between the codes and the corresponding standard vectors. Vector quantization does not, in general, involve discarding any dimensions, but rather quantizes each dimension in order to reduce the occupied storage space.

In this approach, the information loss generally increases as the number of standard vectors decreases, since fewer standard vectors generally means a coarser quantization in the vector space. On the other hand, the information loss generally decreases as the number of standard vectors increases since more standard vectors generally means a finer quantization. Thus, a tradeoff between information loss and compression quality is expected.

As also disclosed herein, the compression of image vectors can be improved by leveraging characteristics of the image vector. For example, because the vector elements are indicative of parameters of mixture model components of a mixture model representing the extracted local descriptors, the underlying mixture model imposes certain correlations on various sets of vector elements. The underlying mixture model also imposes certain patterns on the sparseness of the image vector.

Integration of image vector compression with the image processing can also be problematic. In the case of compression employing a vector quantization algorithm, the values of the codewords making up the compressed image vector are not directly associated with image characteristics. Thus, performing classifier training or other image processing operations using the compressed image vectors is not straightforward.

With reference to FIG. 1, the illustrative image vector compression module 16 employs a vector quantization algorithm to quantize the vectors. Vector quantization involves a mapping $q: \Re^E \to C$ such that a given vector $x \in \Re^E$ is represented by the codewords $c_k$ in the codebook C={$c_k$, k=1,...,K} 40. The cardinality K of the set C comprising the codebook 40 is known as the codebook size. The codebook size K controls the compression level of the vector quantization. For example, if the codebook size K is a power of two, then a single codeword $c_k$ representing an image vector occupies $\log_2 K$ bits.

In general, a smaller codebook size K corresponds to greater compression, but also in general corresponds to greater information loss. However, it is disclosed herein to achieve greater compression without concomitant compression loss by taking advantage of vector element correlations due to the underlying mixture model. Toward this end, the illustrative vector quantization algorithm employed by the image vector compression module 16 employs a product quantizer, in which the image vector is split into a plurality of sub-vectors in an operation 42, each sub-vector is independently compressed using the vector quantization algorithm (and referencing the relevant codebook 40) in an operation 44, and the compressed sub-vectors (that is, the codewords representing the sub-vectors in the case of vector quantization) are concatenated in an operation 46 to generate the compressed image vector 18.

The image vector splitting operation 42 suitably operates as follows. Representing the image vector 14 as x, the vector x is split by the splitting operation 42 into a set of M distinct sub-vectors {$x_m$, m=1,..., M}. Assuming that the sub-vectors are of equal size, each sub-vector $x_m$ has dimensionality G=E/M (although it is also contemplated for the sub-vectors to be of different sizes). Each sub-vector $x_m$ is quantized independently, using a quantizer $q_m$ employing a codebook $C_m$. Thus, there are M quantizers {$q_m$, m=1,..., M} employing M codebooks {$C_m$, m=1,..., M}.

The final codebook C for encoding the entire image vector 14 can be viewed as the Cartesian product $C=C_1 \times C_2 \times ... \times C_M$ and q(x) is the concatenation of the $q_m(x_m)$ terms. To estimate the amount of compression (or, equivalently, the size of the compressed image vector), let b be the average number of bits per dimension. It is assumed that the bits are equally distributed among the codebooks $C_m$ (although more generally it is contemplated to have the codebooks be of different sizes). The size of the codebook C is $K=(2^{bG})^M=2^{bE}$ which is unchanged with respect to vector quantization which does not employ image vector splitting or product quantizer. If the codewords are stored using 4-byte floating point arithmetic, then the cost of storing the codebook C is $4E2^{bG}$ bytes, and the cost of storing a single compressed image vector is bE/8 bytes. Compressing an image vector entails computing $E2^{bG}$ Euclidean distances. To keep this cost reasonable, one approach is to cap the value bG. In some illustrative embodiments employed herein, the cap bG<8 is employed, which ensures that the cost of compressing an image vector using the compression module 16 is approximately not higher than the cost of extracting the image vector itself using the image vector generating module 12.

In the limiting case in which M=E and G=E/M=1, the quantization is performed on a per-vector element basis, and there are no sub-vectors comprising two or more vector elements. This limiting case amounts to scalar quantization, in which each vector element of the original image vector 14 is independently quantized.

Excepting the limiting case in which M=E, an effect of the splitting of the image vector is to form selected groups of vector elements of the image vector. Each group, that is, each sub-vector $x_m$, is then vector quantized using its own codebook $C_m$. The product quantizer works best when the sub-vectors $x_m$ contain correlated dimensions. If no prior knowledge about the relationship between the dimensions is available, automated correlation detection algorithms can be employed to "discover" any underlying correlation structure of the vector elements of the image vector in order to advantageously group correlated vector elements in the sub-vectors. However, such automated correlation detection is computationally expensive for large vectors having tens or hundreds of thousands of vector elements.

Figure 2:
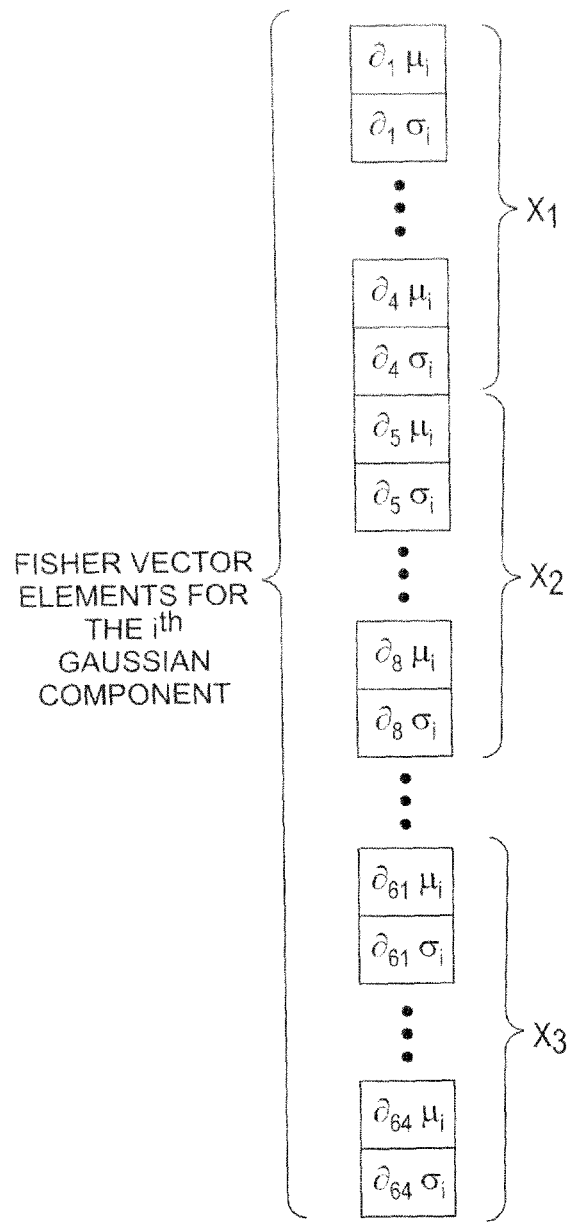
FIG. 2 diagrammatically shows the operation of splitting the Fisher vector into sub-vectors based on mixture model components.

With reference to FIG. 2, however, it is recognized herein that an image vector which has vector elements indicative of parameters of mixture model components of a mixture model representing the extracted local descriptors is expected to have natural correlations. For example, FIG. 2 diagrammatically illustrates vector elements of a Fisher vector representing an image, in which the descriptors x, have dimensionality D=64, the mixture model is a GMM, and the Fisher vector includes gradients computed for each Gaussian mean $\mu_i$ and for each Gaussian variance $\sigma_i$, but not for each Gaussian weight $\omega_i$. FIG. 2 shows only the Fisher vector elements indicative of parameters of the $i^{th}$ Gaussian mixture model component of the Gaussian mixture model representing the extracted local descriptors. The number of gradients P for the $i^{th}$ Gaussian component is P=2D=128 gradients, where the factor of 2 is a consequence of computing a gradient of a $\partial_d \mu_i$ for each descriptor dimension and a gradient of $\partial_d \sigma_i$ for each descriptor dimension, where d=1, ..., D denote the descriptor dimensions (where, again, D=64 in this example). More generally, the image vector has a natural correlation for vector elements indicative of parameters of the same mixture model component (e.g., the $i^{th}$ Gaussian component) of the mixture model (e.g., GMM) representing the extracted local descriptors.

In view of the foregoing, in the illustrative embodiments the image vector splitting operation 42 splits the image vector into sub-vectors in which each sub-vector includes only vector elements indicative of parameters of a single mixture model component. In one suitable approach for the example of FIG. 2 in which there are 128 gradients per Gaussian component (again, that is, 64 feature dimensions and gradient components computed respective to each feature dimension for both mean and variance yielding 128 gradients), the splitting generates 16 sub-vectors per Gaussian component. These sub-vectors are labeled $x_1, x_2, \ldots, x_{16}$ the righthand side of FIG. 2. In this illustrative example each sub-vector has size G=8. For example, sub-vector $x_1 = [\partial_1 \mu_i \; \partial_1 \sigma_i \; \partial_2 \mu_i \; \partial_2 \sigma_i \; \partial_3 \mu_i \; \partial_3 \sigma_i \; \partial_4 \mu_i \; \partial_4 \sigma_i]^T$. This choice for splitting the image vector leverages the underlying mixture model structure to choose sub-vectors having sub-vector elements with typically enhanced correlation.

Figure 3:
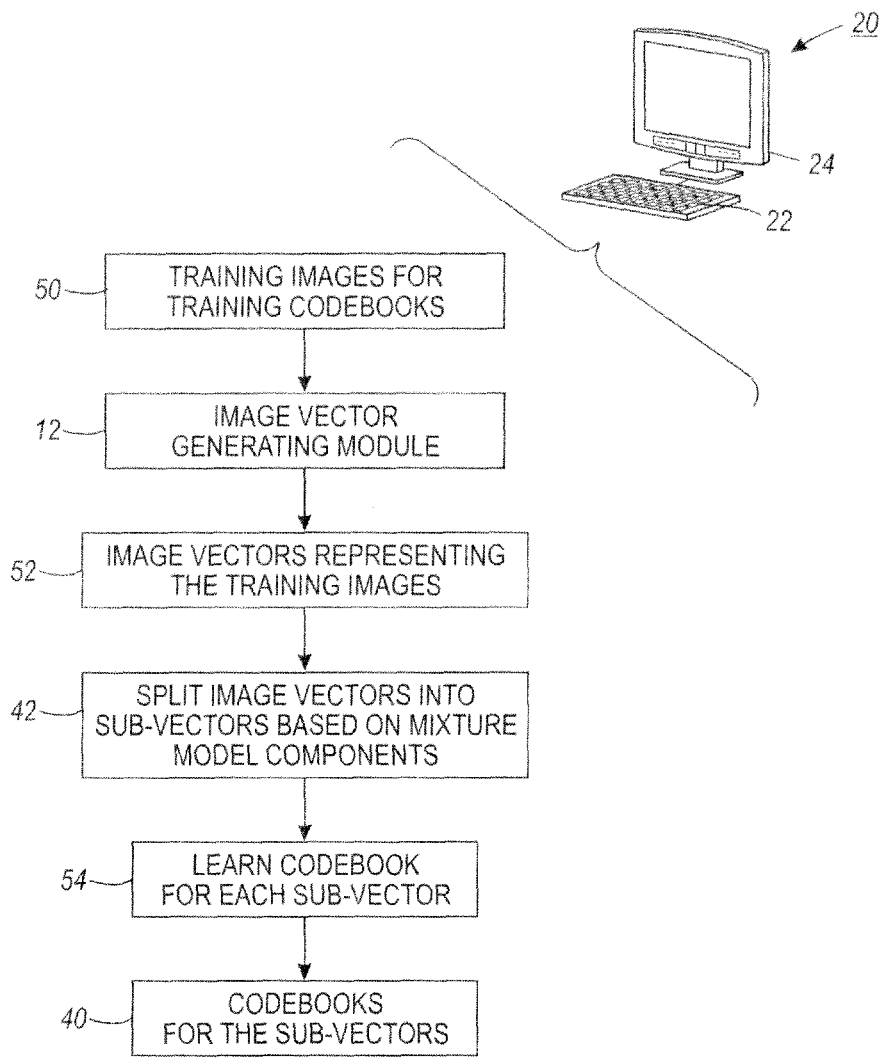
FIG. 3 diagrammatically shows a system for generating the codebooks used in the compression and decompression operations of the systems of FIGS. 1 and 2.

With continuing reference to FIG. 1 and with further reference to FIG. 3, after the splitting operation 42 each sub-vector is independently compressed using the vector quantization algorithm in the operation 44. The independent compression of each sub-vector entails the operations of (1) identifying the nearest "standard" vector using a suitable distance or similarity metric such as the L2 distance, and (2) referencing the codebook 40 to determine the appropriate codeword corresponding to the nearest standard vector. However, the effectiveness of the vector quantization depends on the efficacy of the codebook 40 (including the standard vector corresponding to each codeword). FIG. 3 diagrammatically shows a suitable approach for training the codebook 40, in which a separate codebook is trained for each sub-vector. As diagrammatically shown in FIG. 3, the codebook training operates on a set of training images 50, which may or may not be the same set of training images used for other training operations (e.g., for training an image classifier, an illustrative example of which is discussed herein with reference to FIGS. 5 and 6). The image vector generating module 12 (shown in detail in FIG. 1) is suitably applied to each training image of the set of training images 50 in order to generate a corresponding set of image vectors 52. The vector splitting operation 42 of the image compression module 16 (again, described in greater detail herein with reference to FIG. 1) is applied to each of the image vectors 52 to generate the training sub-vectors for the codebook training. The use of the same vector splitting operation 42 in the codebook training of FIG. 3 and in the image compression module 16 of FIG. 1 ensures correspondence between the training sub-vectors and the corresponding sub-vectors of an image vector undergoing compression by vector quantization. In an operation 54, the training sub-vectors are employed in training a codebook for each sub-vector.

A training approach suitably employed in the operation 54 is as follows. In this example, the mean-squared error (MSE) is used as the distortion measure. This is a reasonable measure of distortion as the similarity measure between two L2 normalized Fisher vectors is the dot product which is equivalent to the squared Euclidean distance. Using the MSE distortion measure, the Lloyd's optimality conditions lead to the well known k-means algorithm for training the codebook for each sub-vector. In this algorithm, a locally optimal codebook is found by alternatively and iteratively (1) assigning sub-vectors to their closest codeword and (2) re-estimating the centroids as the averages of their assigned sub-vectors. The output of the training operation 54 is the codebooks 40 for the sub-vectors.

Note that in the absence of product vector quantization, the training of the (singular) codebook would be computationally difficult or prohibitive. For example, if b bits per dimension are used to encode a given image signature (b might be a fractional value), then the cardinality of the codebook (singular, that is, without using product quantization) would be $K=2^{bE}$. Even for a small number of bits (for example, b=1 bit per dimension) this leads to an incommensurable codebook size. In contrast, by employing product vector quantization using M quantizers, the cardinality of the codebook $C_m$ for each sub-vector is only $K_m = 2^{bG}$ (where, again, G=E/M). The size of the total codebook $C = C_1 \times C_2 \times \ldots \times C_M$ is $K=(2^{bG})^M=2^{bE}$ which is unchanged as compared with vector quantization without product quantization, but the product quantization breaks the codebook training into computationally manageable blocks.

The codebook training diagrammatically shown in FIG. 3 is suitably embodied by a digital processor or digital processing device, such as the illustrative computer 20, or may be suitably embodied as a storage medium storing instructions executable by such a digital processor or digital processing device to perform the codebook training of FIG. 3.

With returning reference to FIG. 1 and with reference again to FIG. 2, further compression is optionally obtained during the sub-vector encoding operation 44 by encoding only sub-vectors of non-zero mixture model components. The Fisher vector is typically fairly dense. For example, in some embodiments, on average, only approximately 50% of the dimensions of the Fisher vector are zero. Typically, attempting to leverage a 50% sparsity to avoid storing codewords for the sparse vector elements would not lead to a substantial compression gain. This is because encoding the index and the value for each dimension would typically take about as much space as would be gained by omitting the sparse vector elements.

However, in the case of an image vector having vector elements indicative of parameters of mixture model components of a mixture model representing the extracted local descriptors, the sparsity (even at only about 50% sparsity) can be effectively leveraged due to the fact that the zeros of the image vector are not randomly distributed in the Fisher vector, but instead appear in a structure. More particularly, there are two cases in which a gradient dimension can be exactly zero: first, it may be that no low-level feature $x_t$ was assigned to the corresponding mixture model component i (e.g., Gaussian component i in the case of a GMM). In this case, $\gamma_t(i)=0$, $\forall t$, or equivalently $\Sigma_{t-1}^T \gamma_t(i)=0$. With reference to FIG. 2, if no low-level feature is assigned to the illustrative $i^{th}$ Gaussian component whose Fisher vector elements are shown in FIG. 2, then it follows that all (illustrative 128) vector elements diagrammatically indicated in FIG. 2 are sparse elements (that is, have values of zero), and every one of the (illustrative sixteen) sub-vectors $x_1, x_2, \ldots, x_{16}$ has all zero elements.

The other case in which a gradient dimension can be exactly zero is if at least one patch was assigned to the considered mixture model component, but the sum of Equation (7) or Equation (8) over the T patches cancels out exactly. This case is expected to be rare, and is therefore disregarded herein.

The leveraging of sparsity of the image vector in the encoding operation 44 then considers only the first case, in which no patch was assigned to a mixture model component. In this case, the gradients with respect to all the parameters of the mixture model component are exactly zero. It follows that the sparsity can be leveraged not on a per-dimension basis level, but rather on a per-mixture model component basis (e.g., per-Gaussian component basis, in the case of a GMM).

A suitable sparsity encoding approach is as follows (assuming by way of illustrative example a GMM). Add one bit per Gaussian component. This bit is set to 0 if no low-level feature $x_t$ was assigned to the Gaussian component, and is set to 1 if at least one low-level feature $x_t$ was assigned to the Gaussian component (that is, assigned with non-negligible probability). Then, if this bit is zero for a given Gaussian component, it follows that all the gradients for this Gaussian component are exactly zero, and therefore the sub-vectors corresponding to this Gaussian component are not encoded by the encoding operation 44. On the other hand, if the bit is 1, then all sub-vectors corresponding to the Gaussian component are encoded by the encoding operation 44.

The additional compression provided by leveraging sparsity on a per-mixture model component basis as disclosed herein is estimated as follows (again assuming a GMM as an illustrative example). Let p be the percentage of Gaussian components with a non-zero gradient vector. As already mentioned, p≈0.5 is expected for the illustrative Fisher vectors employed herein as image vectors. Letting N be the number of Gaussian components, it follows that encoding a Fisher vector requires on average pbE+N bits. Compared with the case in which sparsity is not leveraged at all, this represents a compression gain of $$\frac{bE}{pbE+N}.$$

Since typically, N<<pbE (as an example, for N=256, p=0.5, b=1, and E=131,072 the approximation N<<pbE is valid as N=256<<pbE=65,536), the compression gain by leveraging sparsity on a per-Gaussian component basis is about a factor of 1/p.

The image compression module 16 compresses an image vector using a vector quantization algorithm. One aspect of the illustrative compression process is product vector quantization, that is, splitting the image vector into a plurality of sub-vectors and compressing each sub-vector independently using the vector quantization algorithm. Another aspect of the illustrative compression process is leveraging sparsity on a per-mixture model component basis to reduce the number of sub-vectors that are compressed by the vector quantization algorithm.

In a variant embodiment the product vector quantization is employed (that is, splitting the image vector into a plurality of sub-vectors and compressing each sub-vector independently using the vector quantization algorithm), but without leveraging the sparsity by omitting sparse sub-vectors on a per-mixture model component basis. In other words, in this variant process the encoding operation 44 is modified by not omitting encoding of sparse sub-vectors identified on a per-mixture model component basis.

Figure 4:
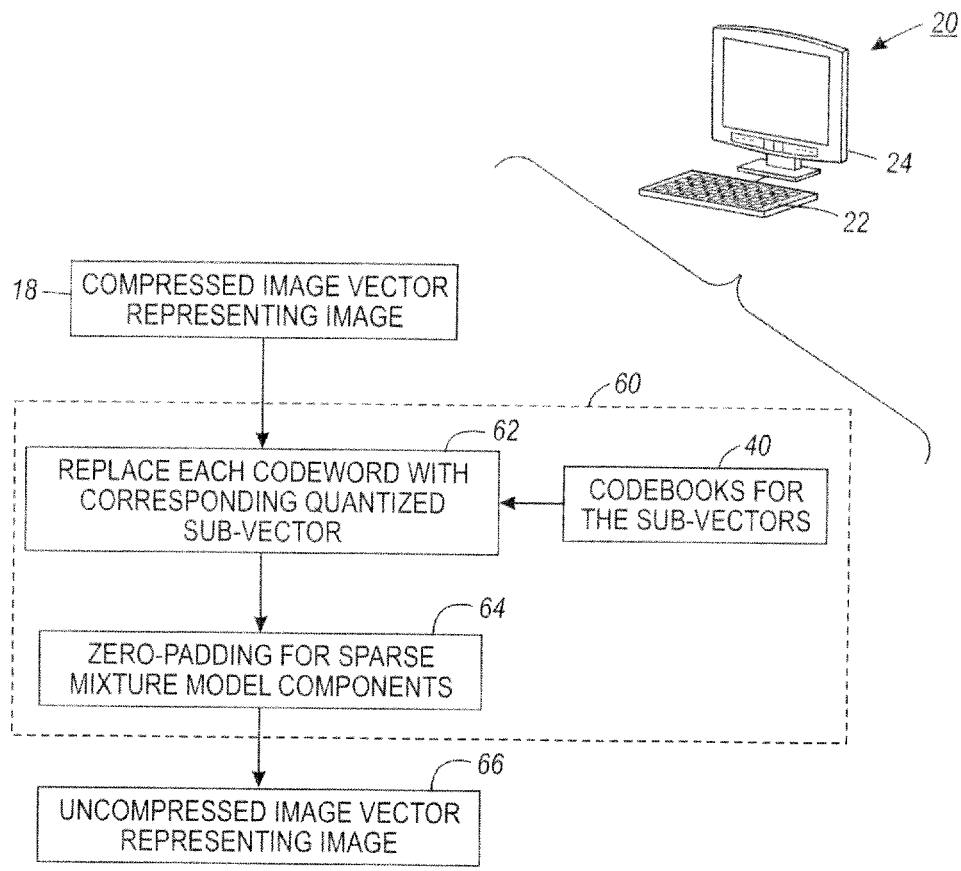
FIG. 4 diagrammatically shows a system for decompressing a compressed Fisher vector generated by the system of FIG. 1.

With continuing reference to FIG. 1 and with further reference to FIG. 4, the output of the encoding operation 44 is a set of compressed sub-vectors, which are concatenated in an operation 46 to form the final compressed image vector 18 representing the image 10. This compressed image vector 18 may be stored in memory or otherwise utilized, taking advantage of the compression to increase storage, transmission, or other utilization efficiency. If the uncompressed image vector is later needed, an image vector decompression module 60 diagrammatically depicted in FIG. 4 can be used to uncompress the compressed image vector 18. In an operation 62, each codeword (representing a sub-vector) is replaced by the corresponding quantized sub-vector (that is, the nearest standard sub-vector, which is represented by the codeword). This replacement operation 62 again references the codebook 40 to determine the standard sub-vector corresponding to each codeword. In an operation 64, any sparse sub-vectors which were not encoded by the encoding operation 44 (because no low-level feature is assigned to the corresponding mixture model component) are filled in with zero-padding. (In general, the order of performing the operations 62, 64 can be swapped). The output of the image vector decompression module 60 is an uncompressed image vector 66 representing the image 10. The uncompressed image vector 66 is expected to be similar to the image vector 14, except for compression loss (that is, information loss introduced by the compression employing the vector quantization algorithm).

The image vector decompression module 60 of FIG. 4 is suitably embodied by a digital processor or digital processing device, such as the illustrative computer 20, or may be suitably embodied as a storage medium storing instructions executable by such a digital processor or digital processing device to perform the functionality of the image vector decompression module 60.

Compressed image vectors generated by the image compression module 16 can be used in various ways, such as to provide more efficient storage of image vector sets. However, performing image processing operating directly on the compressed image vectors is difficult, because the codewords do not have any particular relationship with the corresponding standard sub-vectors. (The correspondence between codewords and corresponding standard sub-vectors is defined only by the codebook 40.) Accordingly, image processing typically entails first decompressing the image vectors using the image vector decompression module 60 of FIG. 4, followed by performing the image processing on the uncompressed image vectors. This approach can be advantageous even if the entire image vector set is uncompressed at the same time, since the compressed image vectors still provide benefits in terms of long-term storage space, transmission bandwidth (for transmission links prior to the decompression), and so forth. However, further benefit can be obtained if the image processing is performed in a way that enables only one, or a few, image vectors to be decompressed at any given time.

Figure 5:
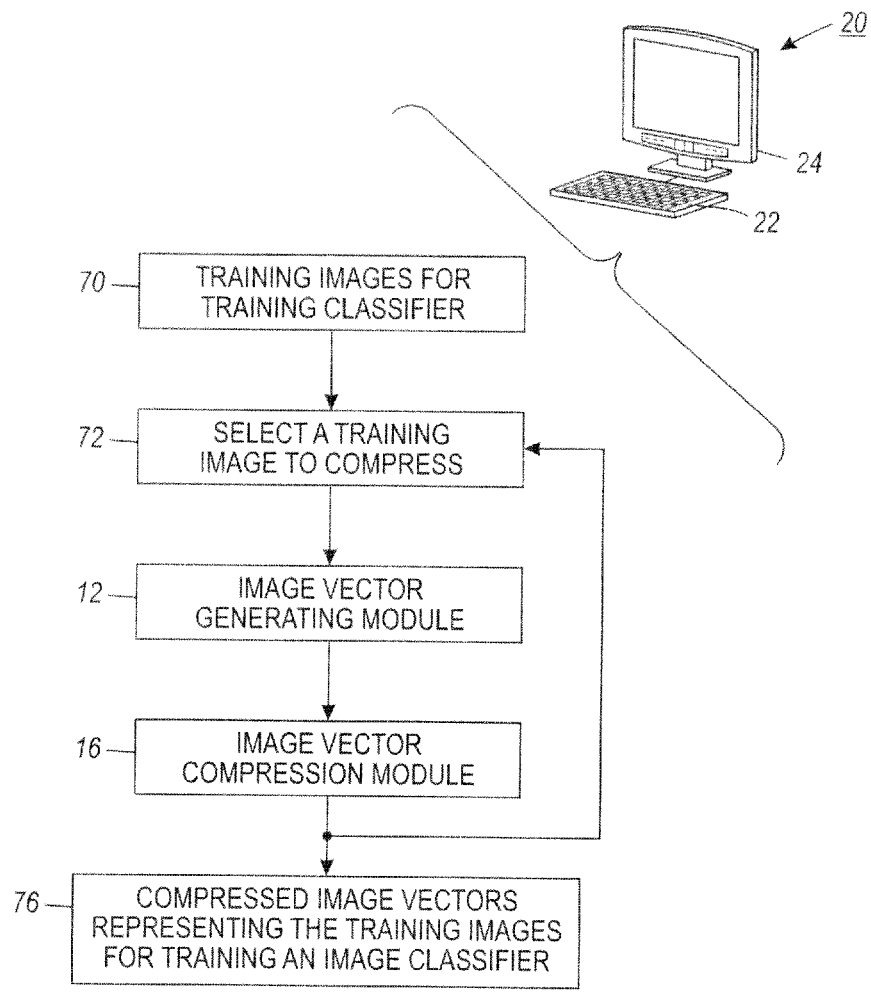
FIG. 5 diagrammatically shows using the system of FIG. 1 for generating compressed Fisher vectors representing training images for training an image classifier.
Figure 6:
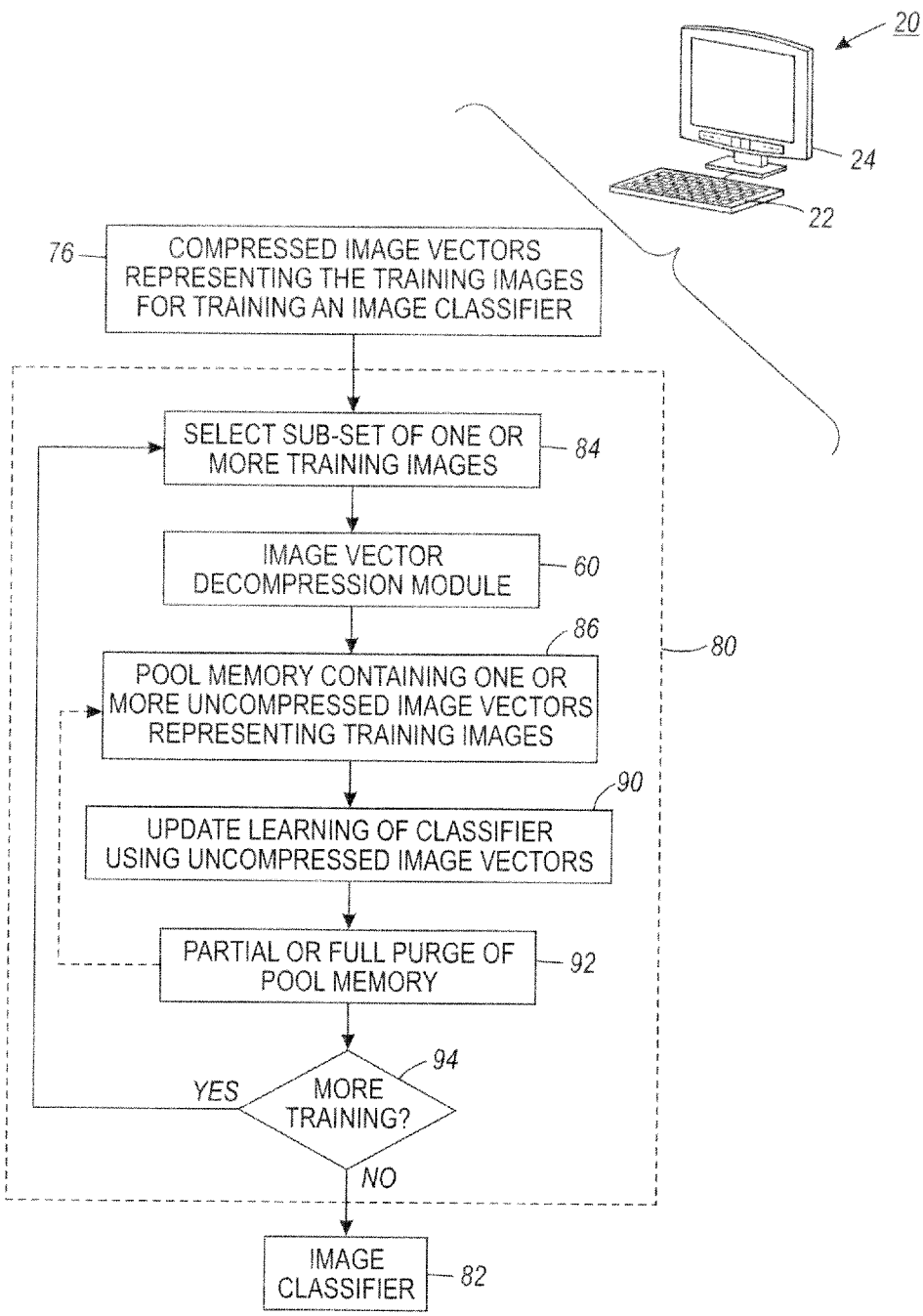
FIG. 6 diagrammatically shows an image classifier training system operating on the compressed Fisher vectors of FIG. 5.

With reference to FIGS. 5 and 6, an illustrative example of image processing performed in a way that enables only one, or a few, image vectors to be decompressed at any given time is described. The illustrative image processing example is the training of an image classifier. With reference to FIG. 5, the classifier is to be trained on a set of training images 70, which may be the same set 50 used in training the codebook 40, or which may be a different set (or, as yet another alternative, there may be partial overlap between the training sets 50, 70). In an operation 72, a training image is selected, The selected training image is processed by the image vector generating module 12 to generate a corresponding image vector which is compressed by the image vector compression module 16. (The modules 12, 16 of FIG. 5 are shown in more detail in FIG. 1.) In a diagrammatically indicated repetition operation 74, the selection operation 72 and processing by the modules 12, 16 are repeated to generate a set 76 of compressed image vectors representing the training images of the set 70. It will be noted that, so long as the image vector that is input to the compression module 16 is deleted after the compressed image vector is generated, there will be at most one uncompressed image vector in existence at any given time during the processing of FIG. 5. The set of compressed training image vectors 76 then serves as input to the image classifier training process shown in FIG. 6.

With reference to FIG. 6, a classifier training module 80 performs the training of an image classifier 82. The classifier training module 80 iteratively learns the classifier 82 by iteratively selecting a sub-set of one or more of the compressed training image vectors from the set 76 in an operation 84, applying the image vector decompression module 60 (shown in more detail in FIG. 4) to decompress the vector or vectors of the selected sub-set, and thereby populating a pool memory 86 containing one or more uncompressed training image vectors. An update learning operation 90 is performed using the one or more uncompressed training vectors of the pool memory 86 to update the classifier 82. A memory purge operation 92 follows, which selectively purges (i.e., removes) one or more uncompressed image vectors from the pool memory 86 to avoid exhausting the pool memory 86. At a decision operation 94, the process flow returns to the selection operation 84 to further add to the contents of the pool memory 86 and iteratively repeat the update learning operation 92 using the updated contents of the pool memory 86.

The pool addition operation 84 (including invocation of the decompression module 60) and the purge operation 92 operate together to dynamically vary the content of the pool memory 86 without allowing the pool memory 86 to overfill or be exhausted (e.g., to avoid an "out of memory" error or a swapping of the data from RAM to disk). These operations 84, 92 can operate together in various ways. In one approach, the operation 84 decompresses exactly one training image vector in each iteration and the purge operation 92 removes exactly one training image vector in each iteration, so that the pool memory 86 includes no more than one uncompressed image vector at any given time, and the update learning operation 90 operates on that one extant uncompressed training image vector. At the opposite extreme, the purge operation 92 may be invoked only rarely, and perhaps not at all if the decision operation 94 terminates the iterative training before the pool memory 86 is completely filled up.

The classifier update learning operation 90 suitably employs any classifier training algorithm that can operate in iterative mode processing one, or a few, training image vectors at a time. Suitable learning algorithms include the stochastical learning algorithms. An advantage of the iterative update learning approach of the trainer of FIG. 6 is that, after the initial training, the image classifier 82 can be later updated with newly obtained training images, for example to accommodate gradual changes over time in the type of images to be classified.

The classifier update learning operation 90 operates on uncompressed training vectors and accordingly the final trained image classifier 82 is configured to classify an image based on its uncompressed image vector. Thus, to classify an input image it is first processed by the image vector generating module 12 to generate a corresponding (uncompressed) input image vector, and the uncompressed input image vector is input directly to the trained image classifier 82 to generate the image classification. Said another way, the (uncompressed) input image vector is input to the classifier 82 without being first compressed by the image vector compression module 16.

The image classifier training of FIGS. 5 and 6, as well as subsequent use of the trained image classifier to perform image classification, is suitably embodied by a digital processor or digital processing device, such as the illustrative computer 20, or may be suitably embodied as a storage medium storing instructions executable by such a digital processor or digital processing device to perform the functionality of the image vector decompression module 60.

Image vector compression experiments employing the disclosed compression techniques were performed by the inventors.

In these experiments, the product quantizer codebooks were learned using a k-means++initialization (see Arthur et al., "k-means++: the advantages of careful seeding", ACM-SIAM Symp. on Discrete algorithms, 2007) followed by standard k-means iterations. Alternatively, a random initialization can be employed. However, in practice, when initialized with k-means++ rather than completely randomly, the subsequent k-means iterations are faster to converge and the MSE at convergence is lower. To compute Euclidean distances, SSE2 operations were used. To speed-up the training, a parallel implementation of the product quantizer was employed, in which different sub-vectors are dispatched to the different cores of a multi-core processor. Learning the product quantizers on a 16 core machine (Intel Xeon with 32 GB of RAM) took approximately 2 hours for E=131,072, M=16,384 (such that G=E/M=8), and b=1. The codebook learning was performed on a training set of approximately 10,000 training samples.

The compression algorithm was integrated directly in the application which extracts Fisher vectors. The compression algorithms entail computing Euclidean distances, and the same optimized Euclidean distance code was used as for the codebook learning.

The decompression algorithm was integrated in the linear classifier training code, and was based on a Stochastic Gradient Descent (SGD) algorithm in which each sample is treated sequentially. The compressed signatures were kept in the random access memory (RAM) of the machine where possible (the purge operation 92 being suitably invoked if the pool memory 86 becomes too full) and decompressed every time they are passed to the SGD learning. The decompression time is negligible compared to the training cost as the operation 62 involves computationally fast look-up table accesses of the codebook 40.

Figure 7:
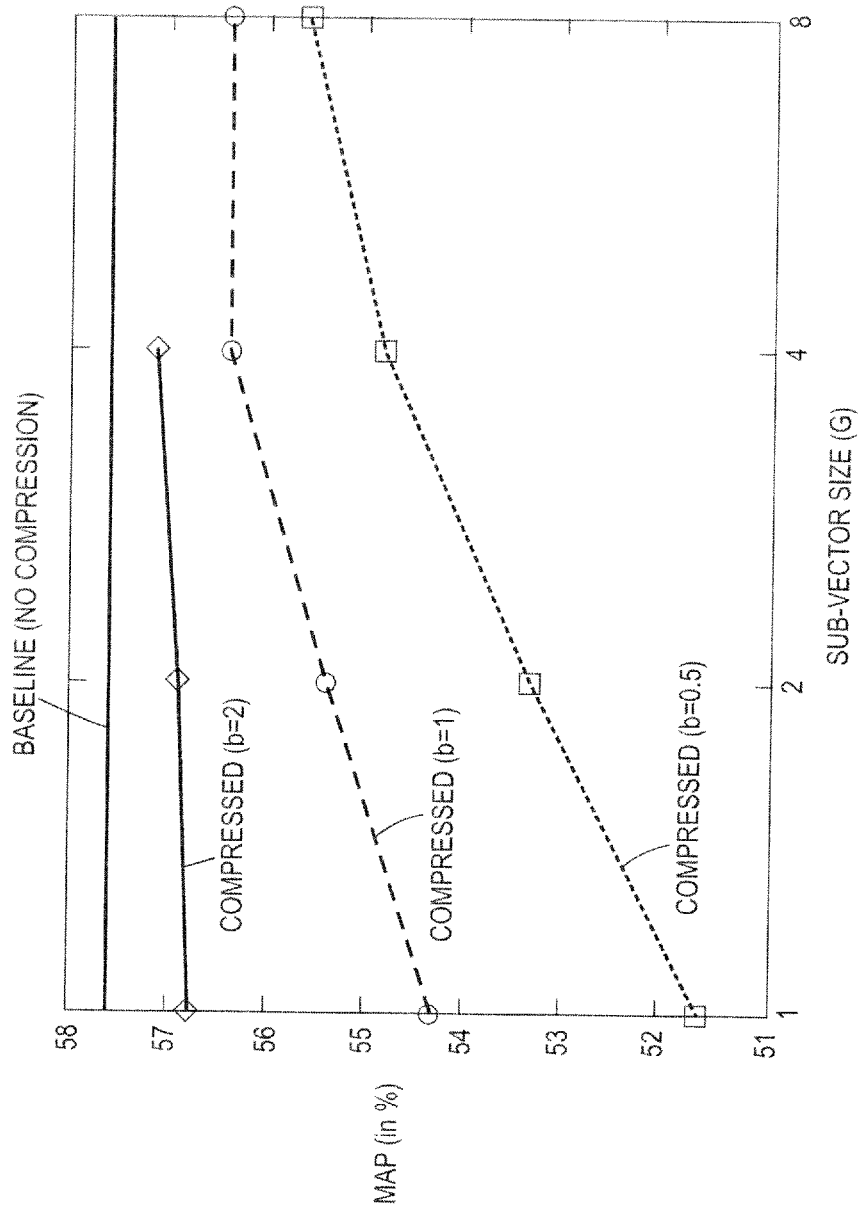
FIG. 7 plots selected experimental results.

With reference to FIG. 7, experimental results are shown for the PASCAL VOC2007 dataset, which contains 20 classes, 5,011 training images and 4,952 test images. Classification accuracy is measured with Average Precision (AP), and the average over the 20 classes (Mean AP or MAP) is reported. The baseline without compression is 57.6%. To learn the product quantizer, an additional set of images was used, which was randomly downloaded from Flickr (www-.flickr.com). The 5,011 image training set of PASCAL VOC2007 was not used to learn the product quantizers because it was too small. (Note that 5,011 codewords and $[\log_2(5,011)]=13$ bits per image would be needed to perform lossless compression of the whole training set). FIG. 7 shows the results for the uncompressed baseline and for compression with b=2, b=1, and b=0.5 for sub-vector sizes of G=1 (corresponding to the limiting case of scalar quantization in which the "sub-vectors" are actually scalar values), G=2, G=4, and G=8.

As seen in FIG. 7, product vector quantization (G>1) provides a substantial improvement over scalar quantization (G=1), and improvement is seen as the sub-vector size increases, up to the highest value shown (G=8). For b=1, a MAP value of 56.4% is obtained for sub-vector sizes G=4 and G=8. The MAP decrease compared to the uncompressed system (MAP=57.6%) is only 1.2%. Without leveraging the sparsity, this would already represent a reduction of the storage from 512 kilobytes per signature down to 16 kilobytes. By leveraging the sparsity the storage can be further reduced, down to approximately 8 kilobytes, corresponding to an approximately 64-fold compression.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a processor to perform a method comprising:
   extracting local descriptors from an image;
   generating an image vector having vector elements indicative of parameters of mixture model components of a mixture model representing the extracted local descriptors; and
   compressing the image vector using a vector quantization algorithm to generate a compressed image vector by operations including splitting the image vector into a plurality of sub-vectors wherein each sub-vector includes at least two vector elements and each sub-vector includes only vector elements indicative of parameters of a single mixture model component, compressing each sub-vector independently using the vector quantization algorithm, and concatenating the compressed sub-vectors to generate the compressed image vector.

2. The non-transitory storage medium as set forth in claim 1, wherein the mixture model comprises a Gaussian mixture model and the vector elements are indicative of at least (i) mean parameters and (ii) variance or covariance parameters of Gaussian mixture model components.

3. The non-transitory storage medium as set forth in claim 2, wherein the vector elements are not indicative of weight parameters of the Gaussian mixture model components.

4. The non-transitory storage medium as set forth in claim 1, wherein the image vector is a Fisher vector comprising a gradient of the mixture model or of a composition of the mixture model in a vector space defined by parameters of the mixture model.

5. The non-transitory storage medium as set forth in claim 1, wherein:
   the compressing of each sub-vector does not compress any sparse sub-vector whose vector elements are indicative of parameters of a mixture model component that does not represent any of the extracted local descriptors.

6. The non-transitory storage medium as set forth in claim 1, wherein the method further comprises:
   performing the extracting, generating, and splitting operations on a corpus of codebook training images to generate codebook training sub-vector sets; and
   learning a codebook for each codebook training sub-vector set, the learned codebooks being used in the compressing.

7. The non-transitory storage medium as set forth in claim 1, wherein the method further comprises:
   performing the extracting, generating, and compressing operations on a corpus of training images to generate compressed training vectors; and
   iteratively learning a classifier by iteratively repeating the operations of (i) uncompressing one or more of the compressed training vectors and (ii) performing an update learning operation using the one or more uncompressed training vectors to update the classifier.

8. The non-transitory storage medium as set forth in claim 7, wherein:
   the operation (ii) performs the update learning on a pool of uncompressed training vectors populated by the operation (i), and
   the iterative learning further iteratively repeats an operation (iii) comprising selectively purging uncompressed training vectors from the pool of uncompressed training vectors.

9. The non-transitory storage medium as set forth in claim 7, wherein the method further comprises:
classifying an input image by performing the extracting and generating operations on the input image to generate an input image vector and applying the learned classifier to the input image vector.

10. The non-transitory storage medium as set forth in claim 9, wherein the classifying does not include performing the compressing operation on the input image vector.

11. A method comprising:
extracting local descriptors from an image;
generating an image vector having vector elements indicative of parameters of mixture model components of a mixture model representing the extracted local descriptors;
splitting the image vector into a plurality of sub-vectors wherein each sub-vector includes at least two vector elements and each sub-vector includes only vector elements indicative of parameters of a single mixture model component;
compressing each sub-vector independently using a vector quantization algorithm; and
concatenating the compressed sub-vectors to generate a compressed image vector representing the image;
wherein the extracting, generating, splitting, compressing, and concatenating are performed by a digital processor.

12. The method as set forth in claim 11, wherein the mixture model comprises a Gaussian mixture model and the vector elements are indicative of at least (i) mean parameters and (ii) variance or covariance parameters of Gaussian mixture model components and the image vector comprises a Fisher vector.

13. The method as set forth in claim 11, wherein:
the compressing and concatenating operations do not compress and concatenate any sub-vector whose vector elements are indicative of parameters of a mixture model component that does not represent any of the extracted local descriptors.

14. An apparatus comprising:
a digital processor configured to perform:
a method of generating a corpus of compressed training image vectors from a corpus of training images including:
extracting local descriptors from a training image,
generating an image vector having vector elements indicative of parameters of mixture model components of a mixture model representing the extracted local descriptors,
compressing the image vector, and
repeating the extracting, generating, and compressing for a plurality of training images of the corpus of training images;
wherein the compressing of the image vector includes:
splitting the image vector into a plurality of sub-vectors wherein each sub-vector includes at least two vector elements and each sub-vector includes only vector elements indicative of parameters of a single mixture model component;
compressing each sub-vector independently using the vector quantization algorithm; and
concatenating the compressed sub-vectors to generate the compressed image vector.

15. The apparatus as set forth in claim 14 wherein the digital processor is further configured to perform a learning method that iteratively learns a classifier by iteratively repeating operations including:
uncompressing a sub-set of the compressed training image vectors to generate a pool of uncompressed training vectors,
performing an update learning operation using the pool of uncompressed training vectors to update the classifier, and
selectively purging uncompressed training vectors from the pool of uncompressed training vectors during the iterative repeating to keep the pool of uncompressed training vectors within a size limit.

16. The apparatus as set forth in claim 14, wherein the image vector is compressed using a vector quantization algorithm.

17. The apparatus as set forth in claim 15, wherein:
the digital processor is further configured to perform:
an image classification method including:
extracting local descriptors from an input image,
generating an input image vector having vector elements indicative of parameters of mixture model components of a mixture model representing the local descriptors extracted from the input image, and
applying the classifier learned by the learning method to the input image vector to generate a classification for the input image.

18. The apparatus as set forth in claim 17, wherein the image classification method does not include compressing the generated input image vector.

19. The apparatus as set forth in claim 14, wherein the compressing of each sub-vector does not compress any sparse sub-vector whose vector elements are indicative of parameters of a mixture model component that does not represent any of the extracted local descriptors.

* * * * *